US007940417B2

(12) United States Patent
Birkenfeld et al.

(10) Patent No.: US 7,940,417 B2
(45) Date of Patent: May 10, 2011

(54) METHOD FOR STORING DATA OF AT LEAST ONE COMPONENT OF A PRINTING PRESS THAT COMPRISES A PLURALITY OF COMPONENTS AND AT LEAST ONE COMMUNICATIONS NETWORK

(75) Inventors: Andreas Stefan Birkenfeld, Karlstadt-Hesslar (DE); Fred Buttner, Karlstadt (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 448 days.

(21) Appl. No.: 12/224,138

(22) PCT Filed: Feb. 27, 2007

(86) PCT No.: PCT/EP2007/051844

§ 371 (c)(1), (2), (4) Date: Aug. 19, 2008

(87) PCT Pub. No.: WO2007/099098

PCT Pub. Date: Sep. 7, 2007

(65) Prior Publication Data

US 2009/0150408 A1 Jun. 11, 2009

(30) Foreign Application Priority Data

Mar. 1, 2006 (DE) ......................... 10 2006 009 374

(51) Int. Cl.

| | |
|---|---|
| ***G06K 15/02*** | (2006.01) |
| ***G06F 3/12*** | (2006.01) |
| ***G06F 15/00*** | (2006.01) |
| ***G06F 9/445*** | (2006.01) |

(52) U.S. Cl. ........ 358/1.16; 358/1.15; 358/1.9; 717/174

(58) Field of Classification Search .................. 358/1.1, 358/1.9, 1.11, 1.12, 1.13, 1.14, 1.15, 1.16, 358/1.17, 1.18; 717/108, 116, 174
See application file for complete search history.

(56) References Cited

U.S. PATENT DOCUMENTS

| | | | |
|---|---|---|---|
| 6,041,705 | A | 3/2000 | Lintner |
| 6,240,847 | B1 | 6/2001 | Zoll et al. |
| 6,903,831 | B1 | 6/2005 | Rapke-Kraft et al. |

(Continued)

FOREIGN PATENT DOCUMENTS

| | | | |
|---|---|---|---|
| DE | 195 27 089 | A1 | 1/1997 |

(Continued)

*Primary Examiner* — Thomas J Lett
(74) *Attorney, Agent, or Firm* — Jones, Tullar & Cooper, P.C.

(57) ABSTRACT

Data of at least one component of a printing machine, that comprises several components and at least one communications network, is stored. Data from one of these components, and which characterizes that component, is stored in a memory unit which belongs to that component, and which memory unit is linked to the communications network. The printing machine may have at least two different control levels that are hierarchically organized. The data from the at least one component may be provided on a lower-order control level. It is transmitted from its memory unit to at least one of the printing machine components on a higher-order control network. The data so transmitted is linked, during its transmission, to the next higher-order control level, with local information regarding the arrangement of the components transmitting data in their respective control levels.

35 Claims, 4 Drawing Sheets

U.S. PATENT DOCUMENTS

| | | | |
|---|---|---|---|
| 7,331,289 B2 | 2/2008 | Albrecht et al. | |
| 2001/0043363 A1 | 11/2001 | Hauck et al. | |
| 2006/0101043 A1 * | 5/2006 | Czotscher et al. | 707/101 |

FOREIGN PATENT DOCUMENTS

| | | | |
|---|---|---|---|
| DE | 196 26 821 | A1 | 1/1998 |
| DE | 298 00 480 | A1 | 4/1998 |
| DE | 100 52 014 | A1 | 5/2001 |
| DE | 103 57 429 | A1 | 7/2005 |
| DE | 10 2004 023 094 | | 11/2005 |
| DE | 10 2004 029 646 | | 12/2005 |
| EP | 0 755 786 | A1 | 7/1996 |
| EP | 0 949 551 | A2 | 4/1999 |
| EP | 0 949 551 | A3 | 4/1999 |
| EP | 0 978 379 | A1 | 7/1999 |
| EP | 1 155 845 | A2 | 4/2001 |
| EP | 1 155 845 | A3 | 4/2001 |
| WO | WO 2004/055609 | A2 | 7/2004 |

* cited by examiner

METHOD FOR STORING DATA OF AT LEAST ONE COMPONENT OF A PRINTING PRESS THAT COMPRISES A PLURALITY OF COMPONENTS AND AT LEAST ONE COMMUNICATIONS NETWORK

CROSS-REFERENCE TO RELATED APPLICATIONS

This application is the U.S. national phase, under 35 USC 371, of PCT/EP2007/051844, filed Feb. 27, 2007; published as WO 2007/099098A1 on Sep. 7, 2007, and claiming priority to DE 10 2006 009 374.7, filed Mar. 1, 2006, the disclosures of which are expressly incorporated herein by reference.

FIELD OF THE INVENTION

The present invention is directed to a method for storing data of at least one component of a printing press that comprises a plurality of components and at least one communications network. Data of a plurality of the components that are integrated into the printing press, and which data characterizes each respective component, is stored in a memory unit which belongs to each such component. Each such memory unit is connected to the communications network of the printing press.

BACKGROUND OF THE INVENTION

A module for a machine used to process sheet-type printing substrates is known from DE 103 57 429 A1. This module is provided with interfaces for control communication, with a memory unit, which can be read and written and which contains the properties of the module. A communications unit, which is used to communicate with other modules and/or with a higher-order control unit of the machine, and which is operatively connected to the memory unit, is also provided.

A control system for a printing press is known from DE 298 00 480 U1. This control system comprises a plurality of computing units. Each computing unit is assigned a non-volatile memory unit, and each computing unit is configured to control the functional sequences of a functional unit of the printing press. A time signal, which is generated by a timing element, can be transmitted to all the computing units. When one of the computing units is active, information documenting the activity of the computing unit can be stored in the non-volatile memory unit that is assigned to that computing unit, along with time information, which corresponds to the time signal being emitted by the timing element at the time of the activity of the computing unit. The computing units are connected to a testing device via a bus system interface. The testing device reads out both the information on the activities of the respective computing units and the associated time information stored in the memory units of the computing units, and uses the assigned time information to allocate and to analyze the information on the activities of the respective computing units.

A rotary screen printing press, with a main roller seated between two that are spaced from one another, is known from DE 196 26 821 A1. One of the rollers is driven by a main drive motor, with a continuous conveyor belt which is stretched between the main rollers. A plurality of printing groups are arranged, in sequence, over the course of the conveyor belt. Each printing group has a printing cylinder and a printing cylinder drive that is allocated to the printing cylinder. The printing groups are embodied as discrete modular components, each with an allocated control module, which can be individually programmed to a different printing program. Each control module can be connected to a network data bus for the printing press in the digital network for the purpose of exchanging operating parameter data between the control module on the one hand and the drive unit or the drive units of the conveyor belt on the other hand, and among the control modules and/or with a control console. The operating parameters for a specific printing program can be established, either using a preset value in the memory of a CPU within the control module, or by a protocol supplied via the network data bus and an interface in the control module.

A device for controlling a printing press is known from DE 195 27 089 A1. The device is comprised of a plurality of computers, configured as a network, and which are connected to one another via a bus system, for the purpose of signal transfer. At least one of the computers has a non-volatile, rewritable memory unit. The bus has an interface, via which program sections and/or parameters can be addressed to at least one of the computers and can be written into the allocated non-volatile, rewritable memory. The computer that is connected to the bus, via the bus interface, can be switched over from the mode of normal machine operation to a second mode, in which the addressing of the computer, and the subsequent transmission of programs and/or parameter data, take place.

A method for setting up a control system for an installation comprising a plurality of units is known from WO 2004/055609 A2. A selection of units, along with data that characterize the units, are held in reserve in a memory unit as data inventory. Using software, the units that are relevant for the system to be planned, and optionally selectable specific configurations from the data inventory, are selected. Using the software, the data that characterize the selected units and the optionally selectable specific configurations are modified to create at least one data set. To set up the control system, this at least one data set is implemented in a data memory of the system.

SUMMARY OF THE INVENTION

The object of the present invention is to devise a method for storing data of at least one component of a printing press which has a plurality of components and at least one communications network, wherein maintenance and/or servicing processes relating to these components are facilitated and/or improved.

The object of the present invention is attained by the provision of a plurality of press components and at least one communications network in the printing press. Data of a plurality of the components that are integrated into the printing press and which data characterize a respective component, is stored in a memory unit that belongs to the relevant component, and which is configured as an integral part of the relevant component and which is connected to the communications network. The printing machine may be provided with two control levels that are different from one another and that are hierarchically organized. The data from the at least one component, and provided on its lower level, can be transferred from its memory unit to the at least one component on a higher-order control level. This data is linked with local information regarding the arrangement of the components which are emitting the data in their respective control levels.

The benefits to be achieved with the present invention consist especially in that maintenance and/or servicing processes that are relating to components of the printing press are facilitated and/or are improved. Data that characterizes components can be acquired continuously, optionally together with a time marking, and can be stored in at least one database. A complete documentation of the use of these components, and optionally of their operating modes, is thereby created. Operating modes that are recognized as unfavorable can be used to automatically generate an alert message. On the basis of an unambiguous identification of the specific components, their use can be tracked. Furthermore, connecting the respective memory units of the components to a communications network enables remote diagnosis to be performed. This also allows updates for firmware and/or software, and parameter files which are necessary to the operation of the respective component, to be made available in a simple manner. In addition, in the case of versions of firmware and/or of software and parameter files that are not compatible with one another, an appropriate message can be automatically generated.

BRIEF DESCRIPTION OF THE DRAWINGS

One preferred embodiment of the present invention is presented in the set of drawings, and will be discussed in greater detail in what follows.

The drawings show:

FIG. 1 a block diagram of a printing press with four control levels; in

DESCRIPTION OF THE PREFERRED EMBODIMENT

The present invention relates to a printing press configured, for example, as a rotary printing press or as a sheet-fed printing press or as an intaglio printing press. These printing presses are preferably configured as rotary printing presses. The printing press prints, for example, using a planographic printing process, such as, for example, using an offset printing process, for example, in a wet offset printing process that uses a dampening agent, or in a dry offset printing process, without a dampening agent. The printing press can be used, for example, as a newspaper printing press or as a commercial printing press.

Figure 1:
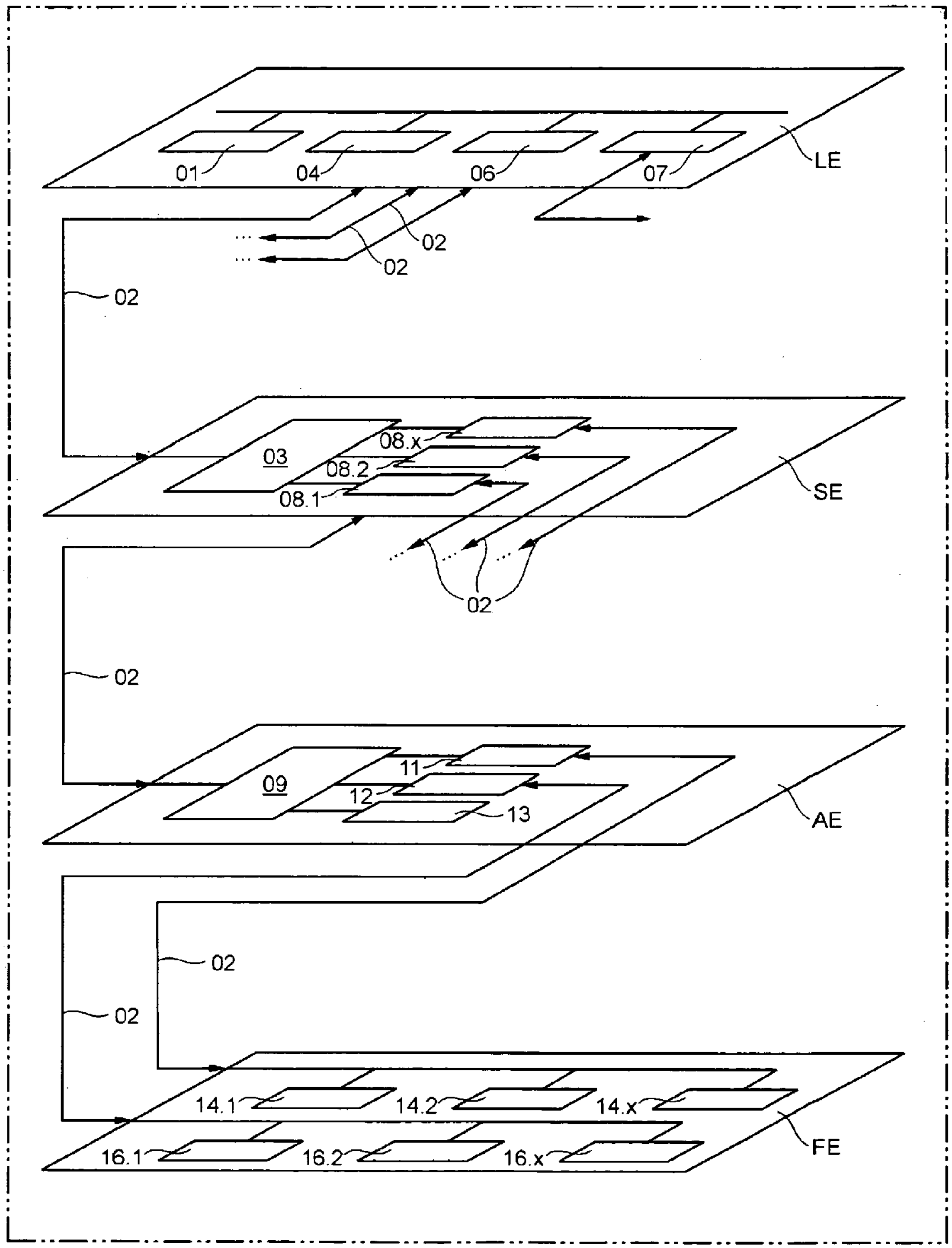

The printing press has at least two control levels in a hierarchical organization. FIG. 1 shows, by way of example, a block diagram of a printing press, which is depicted as being enclosed by a double-dot-dashed line, with four control levels, specifically a command level LE, a section level SE, a unit level AE and a field level FE. The command level LE is the highest level. This highest control level is of higher order than all the other control levels formed in the printing press. In the organization of the control levels in declining sequence, the section level SE follows the command level LE, the unit level AE follows the section level SE, and the field level FE follows the unit level AE. The printing press, in accordance with the present invention, has at least the command level LE and the field level FE as control levels.

The several hierarchically arranged individual control levels of the printing press are interconnected with one another for the purpose of data exchange, in each case via a communications network 02. Identically or differently configured communications networks 02 can be used between the individual control levels of the printing press and/or within the individual control levels of the printing press.

At least one component is assigned to each control level of the printing press. In technical morphology terms, each component represents an individual part within a complex. The complex is configured, for example, as a device that executes a data conversion, or as an apparatus that implements a material conversion, or as a machine unit that executes an energy conversion. In each case, the term component is understood to refer to a component of the respective device or of the respective apparatus or of the respective machine unit. Each component that is arranged in the complex, is assigned, for example, at least precisely one function. However, several different functions may also be assigned to a single component, making said a single component multifunctional. Preferably, several components are assigned to each control level of the printing press, with all of these components together forming the complex in which they are arranged. A complex is a fully autonomous, independently usable unit, such as, for example, a device, an apparatus or a machine unit. The components, which are arranged in the complex can be similar in configuration or can be different in configuration. The components can be electrical, electronic or even non-electric, typically mechanical components, which are integrated into the printing press and which are provided for the operation of the printing press. Examples of mechanical components can include cylinders, rollers, printing blankets, bearings or cutting and/or perforating devices. The components, each of which can be assigned to a control level of the printing press, can participate, for example, either directly or indirectly in the printing process, such as, for example, in the production of a printed product to be produced using the printing press. These components can also have, for example, only a limited period of use, because they are subject to wear and tear, or because they are consumable.

Figure 2:
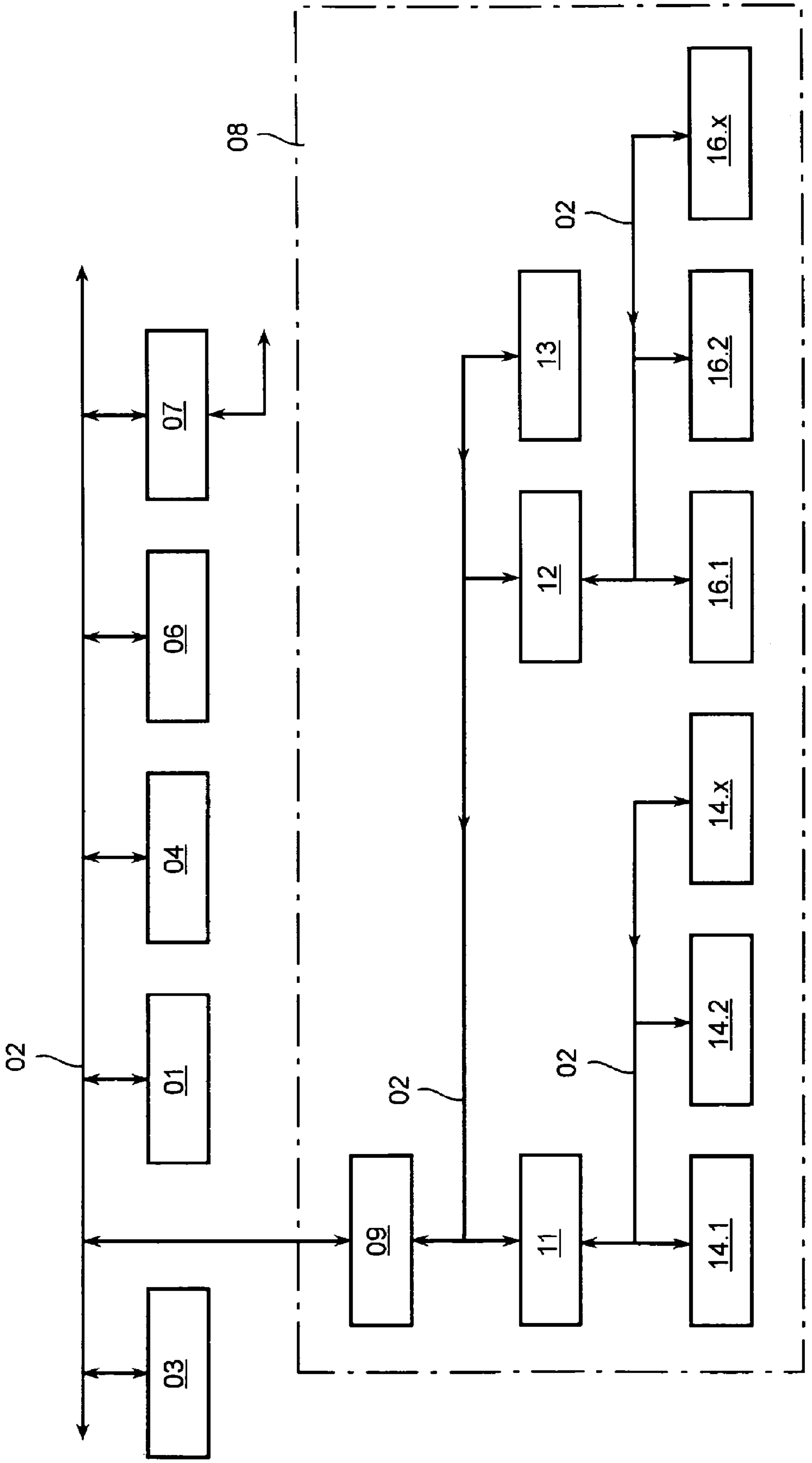
FIG. 2 a block diagram of a printing press comprised of a plurality of functional units.

The individual control levels of the printing press and the components which are respectively assigned to these individual control levels, as represented in FIG. 1, will now be described in greater detail, with reference to FIG. 2. FIG. 2 shows, by way of example, a block diagram of the fundamental functional units of a printing press, each forming a complex, along with their data interconnection via a communications network 02.

The command level LE of the printing press is assigned at least one higher-order control unit 01 and/or at least one operating and/or visualization unit 04 and/or one data server 06 and/or one network interface 07. The higher-order control unit 01 is configured, for example, in connection with at least one control console that is assigned to the printing press. The at least one operating and/or visualization unit 04 and/or the data server 06 can be provided, for example, in structural unit connection and/or at least in data-link connection with the higher-order control unit 01, or in a mobile or stationary computer that can be operated separately from the printing press. The operating and/or visualization unit 04 has, for example, a display device, which especially visualizes data, which are relevant to a printing process that has been, or that will be executed using the printing press. This data is made available, for example, by the at least one higher-order control unit 01 and/or by the data server 06. In the data server 06, for example, all the data that is relevant to a printing process that has been executed, or that will be executed using the printing press can be at least intermediately stored and/or can be managed in accordance with specific parameters. The higher order control unit 01 also has, for example, a memory unit, in which data, which is relevant to a printing process that has been or that will be executed using the printing press, is stored.

The printing press is configured, for example, as a printing system that has a plurality of sections. These sections of the printing system can be operated separately, in production processes that are independent of one another. Each of the individual sections forms a section level SE of the printing press, with each such individual section having at least one section computer 03 in the form of a master computer 03 for use in coordinating the production process to be executed in that individual section. The section computer 03 for each individual section and which is configured as a component of the section level SE, therefore controls a production sequence to be executed by the individual section. The section computer 03 is connected via the communications network 02 to the higher-order control unit 01 of the command level LE. It is also connected, for example, to the data server 06 and/or to the operating and/or visualization unit 04 and/or to the network interface 07 of the command level LE, preferably in a bidirectional data-link connection.

Each of the sections of the printing system has at least one machine unit 08, and preferably a plurality of machine units 08, as depicted schematically by the dot-dash line in FIG. 2. Each of the machine units 08 defines a unit level AE. The machine unit 08, or at least one of the machine units 08, can be configured, for example, as a printing group which has at least two coordinating cylinders and one inking unit, or as an infeed unit, or as a guidance system for a web-type printing substrate, or as a web securing system comprising at least one catching roller, or as a reel changer, or as a logistical system for transporting the printing substrate to the printing press, or as a cooling roller housing, or as a dryer, or as a folding unit. The printing system is preferably comprised of a plurality of such machine units 08, with each of the machine unit 08 forming an autonomous module of the printing system. The printing system preferably has a plurality of similar machine units 08. For example, these machine units 08 can be configured as a plurality of printing groups stacked one on top of another to form a printing tower, and through which a printing substrate that is to be printed is transported vertically. A plurality of these printing towers can be installed in the printing system, arranged in a row horizontally. A plurality of such printing towers, optionally each including at least one additional machine unit 08, such as, for example, a machine unit 08 which is configured as a reel changer or as a folding unit, then form a section of the printing system.

Modules of the printing system are manufactured, installed and tested in their respective function separately and independently of one another. These modules each form a closed, complex, interchangeable functional unit within the printing system. A functional printing press is assembled, on site, by combining and by connecting a plurality of these machine units 08 and other functional units or components, which belong, for example, to the command level LE or to the section level SE.

Each machine unit 08 has at least one electrical, electronic or mechanical component, and preferably has a plurality of such components. One such component can be configured, for example, as a controllable component 14, such as, for example, as a controllable drive unit 14. The drive unit 14 includes, for example, a position-controlled or a speed-controlled or a torque-controlled electric motor. In FIG. 2, a machine unit 08, having a plurality of such controllable components 14, is indicated, by way of example, by a dotted-dashed boundary line. The individual controllable components 14 have an indexing of the reference symbol 14, in the form of 14.1, 14.2 to 14.*x*, with x=1 to n, wherein n denotes the highest ordinal number of controllable components 14 that are present in this machine unit 08. If the printing press has a plurality of these machine units 08 and/or has a plurality of operating and/or visualization units 04, these are indexed in the drawings in the same manner as is being used for the controllable component 14.

The machine unit 08 is connected to the communications network 02 via a data link, and preferably via at least one communications unit 09, which is arranged in, or on the machine unit 08, for example, via an aggregate router 09. The communications unit 09 enables and/or controls the transfer of data between the unit level AE of the machine unit 08 and the section level SE and/or the command level LE, which both lie outside of this machine unit 08. The aggregate router 09 has a logical address, for example, with which logical address, a machine unit 08 can be clearly identified and/or can be individually located within the printing system.

At least one motion control system 11, which controls the drive units 14 of the machine unit 08, can also be provided in, or on the machine unit 08. This at least one motion control system 11 coordinates, for example, the cooperation of a plurality of the drive units 14 that all participate in the same process conducted by the machine unit 08. When a plurality of cooperating, driven axles of, for example, individual drive motors, are provided in the machine unit 08, the motion control system 11 coordinates, in particular, the angular position of each of these drive motor axles in relation to one another. Particularly in the case of a printed product which is produced in a multicolor printing process, the motion control system 11 can also be used to keep the color segments that are used in the printed product true to register by influencing the circumferential register. This can be accomplished, for example, by tracking a cylinder that is driven by one of the drive units 14 to insure that it is within a previously established permissible tolerance range.

A sequence control system 12 can be provided in, or on the machine unit 08. This sequence control system 12 may be configured, for example, as a memory-programmable control system (SPS) with additional data inputs and with data outputs. The sequence control system 12 enables and/or controls the transfer of data to at least one additional field device 16 which is located in the field level FE. A plurality of such field devices 16.1; 16.2; 16.*x* are preferably arranged on the field level FE, with these field devices 16.1; 16.2; 16.*x* being configured, for example, as an auxiliary drive, as an actuator, as a transducer and/or as a sensor. An operating and/or visualization unit 13, such as, for example, an input and/or an output unit, which visualizes, for example, process-relevant data for the machine unit 08 and/or message texts, and/or which enables necessary operational actions for this machine unit 08, can be connected in a data link to the sequence control system 12. The input and/or output unit 13 can also be arranged on the unit level AE of the machine unit 08 and can be in direct data communication with the aggregate router 09. Accordingly, the communications unit 09 and/or the motion control system 11 and/or the sequence control system 12 and/or the input and/or output unit 13 can be arranged on the unit level AE of the machine unit 08. Drive units 14, which are connected in a data link to the motion control system 11, and field devices 16, which are connected in a data link to the sequence control system 12, are preferably assigned to the field level FE of the machine unit 08.

The following hierarchically organized control levels result for a printing press or printing system, for example. Components which are arranged in a specific field level FE, such as drive units and/or field devices 14; 16, are connected, in a data link, to the unit level AE of a specific machine unit 08. Components that are assigned to this machine unit 08, such as, for example, motion control systems and/or sequence control systems 11; 12, enable and/or coordinate the exchange of data between the respective field level FE and the unit level AE. In a printing system, in most cases, a plurality of machine units 08 is combined to form a section of this printing system. Each machine unit 08 exchanges data that are available on its unit level AE with the section level SE of the section to which the respective machine unit 08 belongs, such as, for example, via a communications unit 09, which is configured as an aggregate router 09. Furthermore, the individual sections of the printing system exchange the data collected in their respective section levels SE with the command level LE of the printing system. This data communication is implemented, for example, via the section computer 03 that is assigned to the individual sections. Thus, a plurality of components can be assigned to each of the control levels. The next higher control level receives data from the lower-order control levels, optionally stores it intermediately, and forwards it continuously or cyclically or upon request to another higher-order control level. In this case, data that are transmitted between two or more control levels can also be encoded, in order to increase the transmission reliability by using a cryptographic process.

The communications network 02 of the printing press can have the same configuration between the respective individual control levels, and also between the components that belong to the same control level. However, the configurations of the communications network 02 may also differ from one another in the individual subsections. The communications network 02 preferably transmits electronic, and especially transmits digital, data. It is especially configured to be industrially usable and capable of operating in real time, and can have cable connected and/or even wireless transmission links. It is configured, for example, as a field bus 02. The field bus 02 preferably corresponds to a standard which is known under the name Profibus, Profinet, SERCOS, CAN or Ethernet with TCP/IP protocol. The communications network 02, which is, for example, Ethernet based, can be connected via a network interface 07, which is preferably assigned to the command level LE, for example, to a local area network (LAN) and/or to a worldwide network, such as the Internet, in order to enable remote data transfer to a computer which is not specifically shown, which is not a part of the printing press, and which thus is external. The network interface 07 can also enable, for example, remote access to one or more functional units of the printing press via the other computer, which is not a part of the printing press, and/or a bidirectional data exchange. If the communications network 02 is differently configured in the individual control levels, for example, components belonging to the next higher control level will have a field bus interface. In any case, the individual control levels, together with the communications network 02 that connects them, form a cascaded communications system with respect to the printing press.

Figure 3:
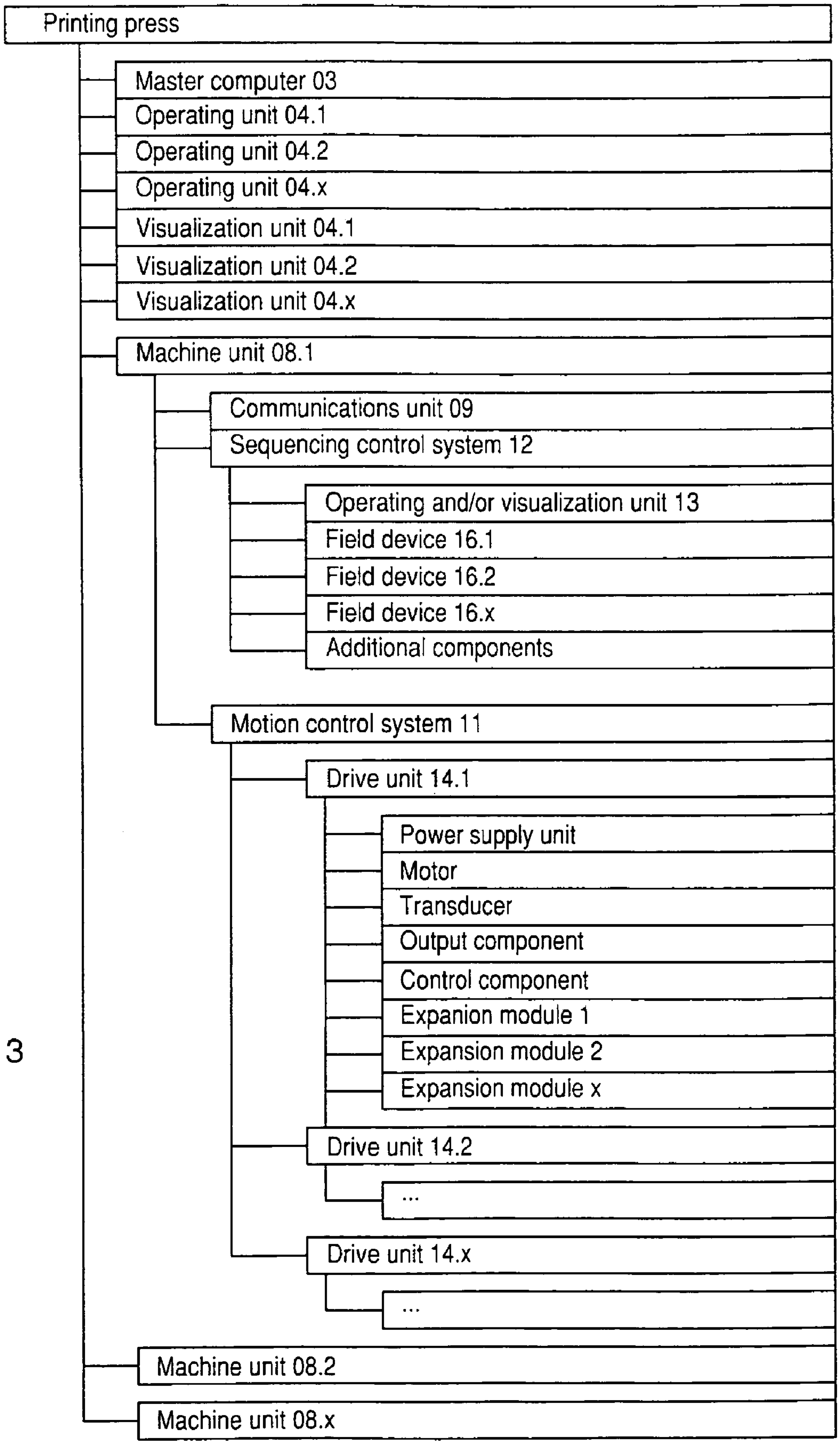
in FIG. 3 an organizational chart of data acquired from functional units of the printing press; and in FIG. 4 a compatibility matrix for firmware and hardware versions for an electronic component arranged in one of the functional units of the printing press.

At least one database is provided in a higher order control level, and especially in the command level LE, such as, for example, in the memory unit of the higher-order control unit 03 and/or in the data server 06 and/or in connection with the operating and/or visualization unit 04. Data that is stored in this at least one database is preferably arranged within a file structure that imitates the control structure of the printing press. However, the database can also be implemented in a mobile or stationary computer, such as, for example, in a notebook or in a computer that is operated separately from the printing press, and which can be at least temporarily connected to the communications network 02 of the printing press. FIG. 3 shows, by way of example, how data from different components of the printing press, which are stored in the database, can be represented structurally by the operating and/or visualization units 04.

At least one component, preferably a plurality of components, and particularly all the components of the printing press, which are arranged, for example, in one of its machine units 08.1; 08.2; 08*x* or in another functional unit, and which each exchange data with at least one control level via the communications network 02, each have a memory unit. This memory unit stores the data that identify the respective component. The respective memory unit of the respective component is configured as a component part that is assigned to the respective component. Each memory unit is connected to the communications network 02. The memory unit is an integral part of the respective component and is preferably permanently connected to the respective component, preferably via a permanent connection. The memory unit is thus permanently installed in or on the respective component, so that the respective component and its respective memory unit together form a single structural component. The memory unit cannot be separated from the component for the period of operation of the component. The memory unit will be destroyed by an attempt to separate it from its respective component. At least, its data can become unreadable and/or non-transmissible by such an attempt. The data that is stored in the memory unit of the respective component can at least be read by the higher-order control unit 01, for example, when that higher-order control unit 01 requests the data. Preferably, the data stored in the memory unit of the respective component of a specific control level can be read by a component of the next higher control level, or can, at least, be transmitted to this next higher control level. In the case of a non-electronic, and especially in the case of a mechanical component, the memory unit of this component is connected to the communications network 02 via a wireless transmission link, for example, using a transponder system, and especially by using a radio label.

The memory unit that is connected to the respective component can contain unmodifiable and optionally can also contain modifiable data, so that the memory unit has a permanent memory unit and optionally also has a modifiable memory unit. The unmodifiable data contains component-specific information and therefore is always present. This modifiable data can be dynamically modifiable, for example, during the period of operation of the component. As a protection against tampering, however, modifiable data should be modifiable only by the respective component itself. This requires that the component have a corresponding writing device for inputting data into the memory unit that belongs to the component. The data which is stored in the memory unit of the respective component can indicate, for example, the structural component type and/or the product identifier for this component, its serial number, hardware version and/or firmware version. The information, for example, on the structural component type and/or the serial number, etc. is included among the unmodifiable data in the respective memory unit. This data is incorporated, for example, into an identification code that identifies the respective component. The memory unit that belongs to the respective component can also be characterized as an electronic type plate or as an electronic device identification card.

The data stored in the respective memory units of components of the same machine unit 08 of the printing press is preferably intermediately stored and/or is managed in a memory unit that is assigned to the relevant machine unit 08, for the purpose of simplifying and/or accelerating transmission of this data to a higher-order control level of the printing press. This memory unit that is used to intermediately store data is preferably configured as a rapid buffer memory and/or is configured in, or at least in connection with the motion control system 11, for example. Data from machine units 08, and belonging to the respective section and their respective components, can also be intermediately stored and/or managed in, or at least in connection with, the section computer 03.

If data from the respective memory units of components of a certain control level is transferred to a component of a next higher control level, this transmitted data is linked with location information. The linkage of the data that identify a component with a location reference, indicating, for example, the spatial arrangement in the printing press of the component transmitting this data, preferably occurs in the next higher control level. The origin of the data, which is transmitted from the lower-order control level, can be determined. For example, if data from the field level FE is compiled on unit level AE, the data transmitted from the drive units 14.1; 14.2; 14.*x* located in the field level FE, or the data transmitted from the field devices 16.1; 16.2; 16.*x* located in the field level FE, is linked with information indicating the location of the respective drive unit 14.1; 14.2; 14.*x* or the respective field device 16.1; 16.2; 16.*x* in the machine unit 08.1; 08.2; 08.*x* to which the unit level AE that is compiling the data belongs. Then, if the data from the unit level AE is to be forwarded to a section level SE, the data that has been transmitted to that section level SE is linked there with location information, which indicate the machine units 08.1; 08.2; 08.*x*, belonging to the printing system, from which this data has been taken. Likewise, data that has been transmitted to the command level LE, is linked there with location information, indicating the section from which the respective data has been taken. With each transmission of data, that characterizes a component to the next higher control level, the location information is continuously updated. In this manner, data that is managed in a database which is arranged on the command level LE, can be clearly identified in terms of its origin, because the component, which is located in the next higher control level, links the data received from a component that is located in a lower-order control level with corresponding location information. The location information relates to the location of the component transmitting data in a lower-order control level. Based upon the location information, which, if applicable, has been updated from one control level to the next, data, which is transmitted up to the database that is preferably located in the command level LE, can be selectively stored in a structured filing order, as depicted schematically in FIG. 3.

In the higher-order control unit 01 and/or in the data server 06, a program, which may also be referred to as a client application, is preferably processed. This program retrieves and manages the data that are stored in the respective memory units of the components belonging to the printing press. The data, which is made available to the database present on the command level LE, can either be read into a predetermined file structure, or this data is characterized by its location information and is correspondingly filed on this basis. The database thus provides, in its filing structure, a virtual image of the arrangement of the components belonging to the printing press. The content of the database can preferably be displayed on the display device of the operating and/or visualization unit 04 and/or on a corresponding device of the higher-order control unit 01 and/or of the data server 06, and/or can be transmitted via the network interface 07 to an external computer, where the contents of the database can be displayed.

The arrangement of the components belonging to the printing press is determined, for example, during the planning of the printing press. The file structure that represents a virtual image of this arrangement can then be applied to the database. For example, when the printing press is placed in operation, the data which is stored, for example, in the respective memory units of each of the components of the sections and/or machine units 08.1; 08.2; 08.*x* belonging to the printing press, is retrieved upon request and is stored in the database. This requested data is preferably stored independently of format, for example, in an XML standard.

It is preferably provided that, each time a component is placed in its active operational mode, for example, by switching on its respective power source, the data stored in each of the respective memory units of the relevant components is transmitted at least to the next higher control level and is ultimately stored in the database. This data transfer can take place immediately as soon as a component is placed in its active operating mode, or it can be delayed somewhat from this time. However, this data transfer can also take place cyclically or at any time upon request. The data that is stored, in connection with the placement of a component belonging to the printing press in its active operational mode, is preferably compared with data relating to this component that was stored when the printing press was placed in operation. If the comparison reveals a discrepancy in the data, for example because the configuration of a section and/or a machine unit 08.1; 08.2; 08.*x* has changed, the current data, which is stored in connection with the placement of a component belonging to the printing press in its active operational mode, is stored, together with a time marking, in the database. The time marking can consist, for example, of a date and/or of a time indicator.

Electronic components must be temporally synchronized with one another in the printing press. This can be accomplished, for example, using a central system clock. Such a central system clock can be run, for example, from the database. A time signal that temporally synchronizes components can also be generated, in a decentralized manner, within each control level. Events occurring in different control levels are then to be synchronized with one another. The data, which is stored in the database over time, and after the printing press has been placed in operation, is preferably stored chronologically. The order of this data allows a change in a component to be identified. The filing order of the data, that is equipped with a time marking, indicates the time of an exchange of an individual component or of an entire machine unit 08.1; 08.2; 08.*x*. The span of time between the installation of this component or of the machine unit 08.1; 08.2; 08.*x*, such as, for example, when the printing press was placed in operation, and the time of the exchange of this component or of this machine unit 08.1; 08.2; 08.*x*, allows its respective service life to be determined. It is also possible, for example, to selectively initiate maintenance work, based upon the stored serial numbers, for example, in connection with a recall. If the service life for the components belonging to the printing press, and which is stored in the database, is exceeded, the higher-order control unit 01 and/or the data server 06 can issue a message indicating this condition, for example, via one of the operating and/or visualization units 04; 13.

Because the data stored in the database contains, among other information, an indication of the version of the hardware, firmware and/or the parameter files which are running on, for example, an electronic component, this information can be used, for example, in connection with a compatibility test for identifying version conflicts, to selectively initiate an update and/or an automatic loading of specific firmware, software and/or a parameter file, such as, for example, following a replacement of this electronic component. In addition, by recording the version status of the firmware, software and/or the parameter files, these can be reset, for example, in the event of an unsuccessful update. Furthermore, information regarding versions of hardware, versions of firmware and/or software and versions of parameter files, which run on electronic components and which are capable of working with one another without problems, can be compiled as master data that characterizes this type of printing press. This master data can be used in planning another, similar printing press.

Figure 4:
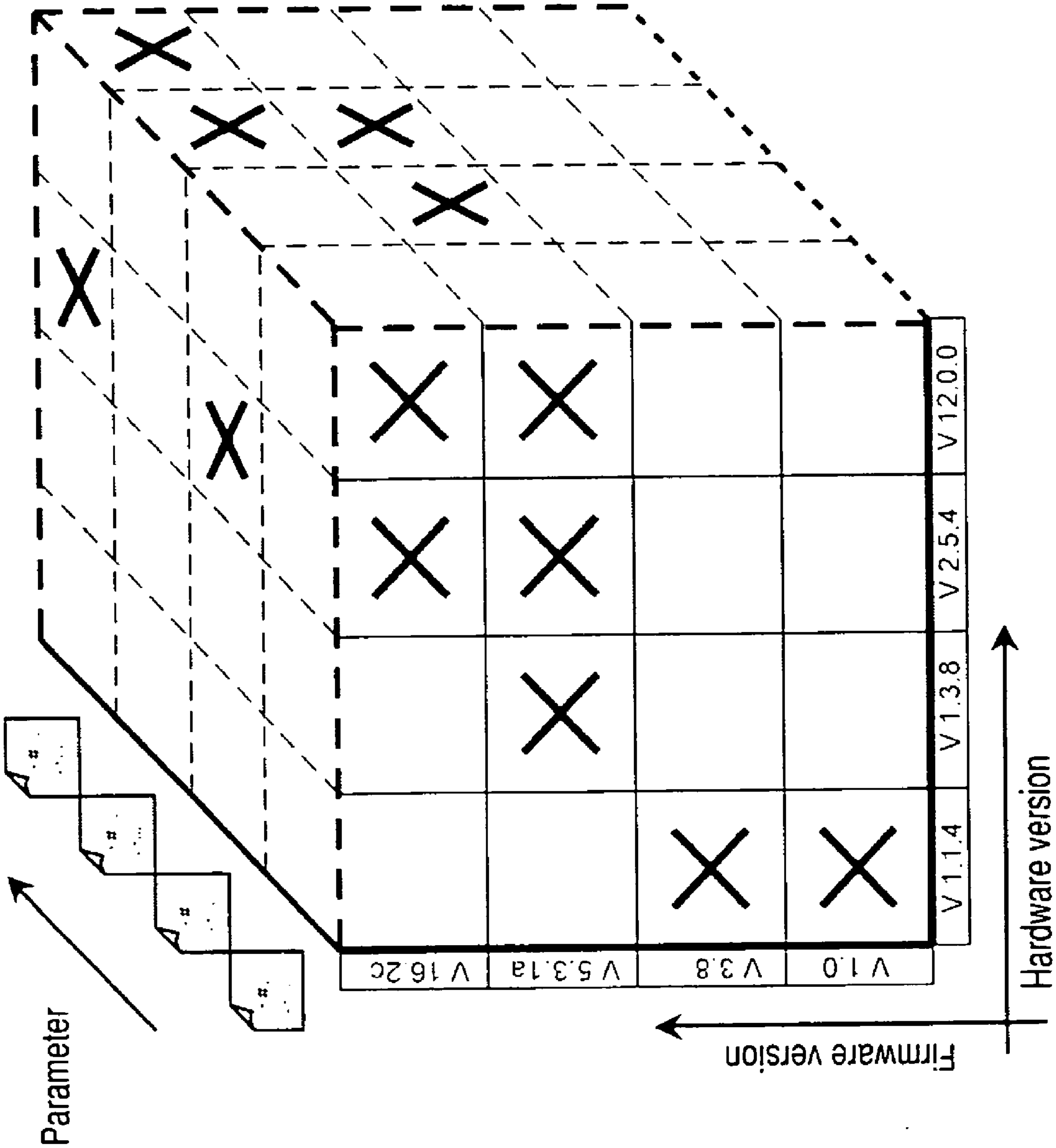

FIG. 4 illustrates a process of compatibility testing to avoid version conflicts, which can be performed on the basis of the data stored in the database. For example, each electronic component which is located in a machine unit 08.1; 08.2; 08.*x* consists of at least one hardware component, which, in the same type of component, can have a different developmental status. Particularly in the case of a complex function, the electronic components which are located in one of the machine units 08.1; 08.2; 08.*x* generally contain a logic unit, such as, for example, a controller, with firmware that influences functionality. During maintenance of the hardware, the firmware that is running in the controller of the electronic component can be changed, thereby allowing the functionality of the electronic component to also be changed. Furthermore, the functionality of an electronic component, as determined by a controller, can be adapted to the intended application using a modifiable parameter file. This is the case, for example, with an electronic control unit for a drive unit such as the controllable components 14.1; 14.2, 14.*x*.

The compatibility of the hardware, firmware and the parameter file is of considerable importance for the trouble-free operation of the relevant electronic component. For the simple management of the version status of the respective hardware, firmware and the parameter file, for example, a three-dimensional compatibility matrix is used, as is illustrated, by way of example, in FIG. 4. All the versions of the hardware, firmware and the parameter file that are capable of working in combination with one another without problems, and which are approved for the relevant electronic component, are continuously updated in this universally applicable compatibility matrix. A local, system specific compatibility matrix is maintained in a memory unit of the printing press, for example, in the higher-order control unit 01 and/or in the data server 06. This matrix displays all current combinations of hardware, firmware and parameter files, which have already been installed in the printing press, for the respective electronic components. When one of the electronic components of the printing press is to be replaced, the local compatibility matrix is used to select a suitable parameter file, based on the version of hardware and firmware of the relevant component. If an electronic component, with an as yet unknown version of hardware and/or firmware, is to be used in the printing press, the universally applicable compatibility matrix is accessed in order to determine a combination that is approved for the relevant electronic component, and that is capable of running. This is then added to the local compatibility matrix. This compatibility testing ensures that only versions of hardware and/or firmware and parameter files that can work together, without problems, will be used in the respective electronic components. An intentional deviation from the findings of the automatically conducted compatibility test preferably requires manual confirmation by operating personnel. This may be required if an electronic component is to be actually operated using versions of hardware and/or firmware and parameter files that have not yet been approved.

Together with the data which is stored in the at least one database, additional operational data from the components belonging to the printing press is stored. This additional operational data can also be equipped with a time marking. This additional operational data relates, for example, to a speed, to a drive torque, to an operating temperature, to a service life for the component, or to other data relating to its operation. By linking the data which is stored in the database, which may optionally be equipped with a time marking, and with additional operational data on the respective components, for example, an overload status for the respective components can be identified. Preventive maintenance work, such as, for example, to prevent a failure of these components, can be initiated by the higher-order control unit 01 and/or by the data server 06, and/or in connection with an external computer. By linking these types of data, favorable and less favorable operating modes for the respective component can be determined. The determination of less favorable operating modes can be used, for example, to cause the higher-order control unit 01 to generate a message warning of this determination, which message can be provided, for example, in the form of an automatically generated notification of the printing press manufacturer, such as, for example, via e-mail. A message, which can be generated, for example, by the higher-order control unit 01, can also be visualized on the display unit of the operating and/or on the visualization unit 04 of the command level LE of the printing press and/or on the operating and/or visualization unit 13 which is to be assigned to a machine unit 08.1; 08.2; 08.*x*. This message can indicate a less favorable operating status of one of the components and/or can indicate maintenance work that is necessitated, such as, for example, by the service life, and/or can indicate an update of firmware, software and/or a parameter file that has been performed or that should be performed. These messages, which are initiated by the higher-order control unit 01 and/or by the data server 06 and/or in connection with an external computer, can be implemented in clear text and/or graphically supported, such as, for example, using a pictogram, on one of the operating and/or visualization units 04; 13.

With this previously described arrangement, a method for storing data of at least one component of a printing press, which printing press comprises a plurality of components and at least one communications network 02, can be implemented. Data of at least one of the components, which characterizes that component, is stored in a memory unit, which belongs to this relevant component and is connected to the communications network 02. The method especially comprises the process steps that, in the printing press, which has at least two control levels LE; SE; AE; FE that are different from one another and which are hierarchically organized, in which the data of at least one component located in a lower-order control level SE; AE; FE is transferred from its memory unit, via the communications network 02, to at least one component that is located in a higher-order control level LE; SE; AE. This data that has been transferred to the at least one higher-order control level LE; SE; AE is linked, in each case during its transfer from one control level to the next higher control level LE; SE; AE, with location information relating to the location of the component transmitting the data in its respective control level SE; AE; FE. In this case, the data that characterizes the respective component is preferably stored together with the location information belonging to this component in a database. The database preferably requests the data to be stored in the database from the memory unit of the respective component. The database thus functions as the master in its communication with the respective memory unit of the respective component. It is advantageous to store the data, which has been received from the respective component in the database, in a structure that presents a virtual image of the arrangement of the components that belong to the printing press.

A method for storing data of at least one component of a printing press, which printing press comprises a plurality of components and at least one communications network 02, can alternatively or additionally be provided. In this method, data of at least one of the components, which characterizes that component, is stored in a memory unit that belongs to this relevant component and which is connected to the communications network 02. The method especially has the process steps that data, which characterizes at least one component, is requested from the relevant memory unit of that at least one component by at least one database, which relevant memory unit has a structure that presents a virtual image of the arrangement of the components that belong to the printing press, and that data is then stored. In this case, the data that characterizes the respective component is preferably requested by the database using location information, which location information is stored in the database for the relevant component, and which information relates to the location of this component in the printing press.

In the first process, components, which are located in a lower-order control level SE; AE; FE of the printing press, report their respective data to a higher-order control level LE; SE; AE. Location information is added to this data, preferably with each transfer of this data from the lower-order control level SE; AE; FE to the higher-order control level LE; SE; AE. This location information provides information as to the location in the printing press of the component that is transmitting the respective data. This location information can be used, for example, to allocate the component which is transmitting the respective data to a specific machine unit 08 of the printing press. In this method, the data is moved from "below" to "above", so to speak. In this process, it is not necessary for a structure outlining the arrangement in the printing press of the components transmitting the data to already be stored in the database, which is collecting the data. One advantage of this method is that the precise configuration of the printing press and the spatial arrangement of its components need not be known at the start of data collection. The collection of data therefore takes place in a structurally open, adaptable system. A component, that is added to the printing press at a later time, can transfer its specific data to the database without prior registration in the database. The collected data is nevertheless stored in the correct allocation to a specific component of the printing press.

In the second of the above-described processes, a structure that reflects the arrangement of the components which are transmitting data in the printing press, is stored in the at least one database. With this process, the file structure of the respective database will show from which components a transfer of data can be expected. In this case, the initiative for a data transfer originates with the database that is collecting the data. Data, which is received by the database, is assigned specific "positions" based upon the structure of the arrangement of the components which are transmitting the data in the printing press, which is stored in the database. One advantage of this method consists in that the data to be stored in the database can be tested for completeness in a simple manner. If a component provides no data, although it is expected to do so because the relevant component has been identified as transmitting data based upon the structure of the database, the database can generate a message indicating this lack of data as, for example, a situation that is considered to be an operational malfunction.

In the two aforementioned methods the database can be operated in a component which is configured as a control unit 01 that is of a higher order than a component transmitting the data, or in a component which is configured as a data server 06. In another alternative or additional advantageous embodiment, the database can be operated in a stationary computer or in a mobile computer, which can be connected to the communications network 02 via a network interface 07, such as, for example, in a notebook that can be connected to the network interface 07 of the communications network 02 of the printing press. After the data, which relates, in each case, to a specific component of the printing press, have been transferred to the database that is operated on the notebook, that notebook can be operated separately from the printing press. The database, with the data which has been transferred from the components of the printing press, can be operated independently of the printing press, and the data from these components of the printing press can, for example, be evaluated elsewhere. A stationary computer that has the database can be, for example, a computer of an operator or of a manufacturer of the relevant printing press. This computer can be connected, at least temporarily, to the communications network 02 of the printing press, for example, via the Internet, the Intranet or via another data communication device.

In both methods, the memory unit of the component transmitting the data can be embodied in a connection with the relevant component, which connection is inseparable, at least during the operation of that component. The database preferably requests data that characterizes each of the components, which are located in the printing press, from the respective memory units of these components. The database preferably requests data characterizing a respective component from the respective memory unit of this at least one component located in the printing press, once this printing press has been placed in operation. It is also possible for at least one of the components, which are located in the printing press, to transfer the data stored in its memory unit to the database each time it has been placed in its active operating mode. The database preferably compares the data, which was requested from the memory unit of one of the components belonging to the printing press once the printing press was placed in operation, with the respective data which is transferred with each placement of a component in its respective active operational mode, and stores the current data, together with a time marking, for example, in the database, if the comparison indicates an inconsistency in the compared data. The data that characterizes the respective component is therefore preferably stored in the database, together with information relating to the time of the data transfer. The data, which is transferred from the respective memory units of the components belonging to the printing press, is especially stored in chronological order.

As was previously mentioned, the data, which is stored in the at least one database of the components belonging to the printing press, is preferably made available for remote access. Additional operational data of the components belonging to the printing press can also be stored in the database. For example, a service life for the components belonging to the printing press can also be stored in the database. If one of the components belonging to the printing press should exceed its service life, as stored in the database, this information can be reported, for example, by at least one operating and/or visualization unit 04; 13 of the printing press or of the external computer or of the mobile notebook. A compatibility test is preferably performed to detect a version conflict with respect to hardware and/or firmware and/or parameter files to be used in relation with an electronic component. A detected version conflict, with respect to hardware and/or firmware and/or parameter files to be used in relation with an electronic component, is reported by the at least one operating and/or visualization unit. The initiation of the operation of an electronic component, despite a reported version conflict with respect to the hardware and/or firmware and/or a parameter file of this component, requires, for example, a manual confirmation by the operator of the printing press. To avoid a version conflict, with respect to the hardware and/or the firmware and/or the parameter files to be used in relation with an electronic component, for example, an update of the firmware and/or the parameter file is supplied to the relevant component and is performed with respect to this component.

In the second method, the respective memory units of components which are located in at least two control levels LE; SE; AE; FE of the printing press, with these at least control levels being different from one another and being hierarchically organized, are connected to the communications network 02. The memory unit of a component, which is located in a lower-order control level SE; AE; FE, transfers the data stored in this memory unit, and which data characterizes this component, especially to at least one component that is located in the next higher control level LE; SE AE. The component that is located in the next higher control level LE; SE; AE then preferably links this data received from a component located in a lower-order control level SE; AE; FE with location information. The location information relates to the location of the component transmitting the data in a lower-order control level SE; AE; FE. The data, which characterizes the component, is linked with its respective location information within the database, for example. With each data transfer from one control level SE; AE; FE to the next higher control level LE; SE; AE, the data, which characterizes the component, is preferably supplemented with location information relating to the control level SE; AE; FE that is transmitting the data. With a transfer of data over a plurality of control levels LE; SE; AE, a chain of multiple pieces of location information, and outlining the transfer pathway, is formed. The data, which characterizes a component, and which is stored in its memory unit, is preferably transferred to the highest-order control level LE of the control levels LE; SE; AE; FE belonging to the printing press.

In the memory unit, which is configured as a part of the respective component, unmodifiable and/or modifiable data can be stored. For example, in the memory unit belonging to the respective component, an indication of at least the component type and/or the serial number and/or the hardware version and/or the firmware version of the respective component is stored. The indication of the component type and/or the serial number and/or the hardware version and/or the firmware version of the respective component is stored in the memory unit of the respective component as unmodifiable data. Data, that is stored in the memory unit of the respective component as modifiable data, is preferably modified only during the period of operation of the respective component. Moreover, data, which is stored in the memory unit of the respective component as modifiable data, is modified only by the respective component itself.

If data from at least one component, and characterizing that component, which component is configured as a machine unit 08 and which component is located in a lower-order control level SE; AE; FE, is stored in its respective memory unit, the machine unit 08 can be configured as an infeed unit, or as a guidance system for a web-type printing substrate, or as a web securing system comprising at least one catching roller, or as a reel changer, or as a logistical system for transporting the printing substrate to the printing press, or as a printing group, or as a cooling roller housing, or as a dryer, or as a folding unit. Data from one of the control levels LE; SE; AE; FE of the relevant machine unit 08 can be intermediately stored and/or managed in a memory unit belonging to that machine unit 08. Moreover, for example, at least one drive unit 14, which is arranged in the machine unit 08, is controlled by at least one motion control system 11 that is provided in the machine unit 08. Furthermore, for example, at least one sequencing control system 12, which is provided in the machine unit 08, enables and/or controls at least the transfer of data to at least one field device 16 that is located in an additional lower-order control level SE; AE; FE. It is also advantageous to provide at least one component, configured as an operating and/or as a visualization unit 04, for visualizing data that is relevant to the printing process in the highest-order control level LE.

With at least one communications unit 09 provided in a control level LE; SE; AE FE, at least this control level LE; SE; AE; FE is connected to the communications network 02. The communications network 02 is configured, for example, as a field bus 02. The communications unit 09 is configured, for example, as an aggregate router 09. Data to be transferred between two or more control levels LE; SE; AE; FE is transmitted, for example, in encoded form.

While preferred embodiments of methods for storing data of at least one component of a printing press that comprises a plurality of components and at least one communications network, in accordance with the present invention, have been set forth fully and completely hereinabove, it will be apparent to one of skill in the art that various changes in, for example, the specific structure of the controllable components and of the field devices, the specific drives for the components, and the like could be made without departing from the true spirit and scope of the present invention which is accordingly to be limited only by the appended claims.

What is claimed is:

1. Method for storing data of at least one individual component of a printing press, which printing press comprises a plurality of said individual components and at least one communications network, wherein data of each of a plurality of the individual components that are integrated into the printing press, and which data characterizes each individual component, is stored in an individual component memory unit, which belongs to this individual component, which individual component memory unit is configured as an integral part of the individual component, and which individual component memory unit is connected to the communications network, wherein in the printing press, which has at least two control levels that are different from one another and are hierarchically organized, the data of a plurality of the individual components, which are located in the printing press in a lower-order control level, are transferred, via the communications network, from their individual component memory units to at least one component, which is located in the printing press in a higher-order control level, wherein these data, which are transferred to the at least one component which is located in the higher-order control level, are linked, in a continuous updating process, with location information relating to the location of the individual lower level component which is transmitting the data in its lower level control level each time such data are transferred from one control level to a next higher control level.

2. Method according to claim 1, characterized in that the data that characterizes each individual component is stored, together with the location information belonging to this individual component at least in one database.

3. Method according to claim 1, characterized in that the memory unit of the individual component transmitting the data is embodied in a connection with the individual component which is inseparable, at least during the operation of said individual component.

4. Method according to claim 1, characterized in that at least one of the individual components which are located in the printing press transfers the data stored in its memory unit to the database, each time it is placed in its active operational mode.

5. Method according to claim 1, characterized in that a compatibility test is performed to detect a version conflict with respect to at least one of hardware and firmware and parameter files to be used in relation to an electronic component.

6. Method according to claim 1, characterized in that at least one of unmodifiable and modifiable data are stored in the memory unit, which is configured as a part of an individual component.

7. Method according to claim 1, characterized in that an indication of at least one of the structural component type and the serial number and the hardware version and the firmware version of each individual component are stored in the memory unit belonging to the individual component.

8. Method according to claim 1, characterized in that data stored as modifiable data in the memory unit of each individual component is modified during the period of operation of the individual component.

9. Method according to claim 1, characterized in that data stored as modifiable data in the memory unit of each individual component is modified only by the individual component itself.

10. Method according to claim 1, characterized in that at least data that characterizes one component which is located in a lower-order control level and which is configured as a machine unit, is stored by this component in its memory unit, wherein the machine unit is configured as one of an infeed unit, as a guidance system for a web-type printing substrate, as a web securing system comprising at least one catching roller, as a reel changer, as a logistical system for transporting the printing substrate to the printing press, as a printing group, as a cooling roller housing, as a dryer, and as a folding unit.

11. Method according to claim 1, characterized in that at least one component configured as one of an operating and visualization unit, for visualizing data that are relevant to the printing process, is located in the highest order control level.

12. Method according to claim 1, characterized in that at least one communications unit, which is provided in a control level, connects at least this control level to the communications network.

13. Method according to claim 1, characterized in that data to be transferred between two or more control levels is transmitted in encoded form.

14. Method according to claim 2, characterized in that the data received from each individual component is stored in the database in a structure that presents a virtual image of the arrangement of the plurality of individual components belonging to the printing press.

15. Method according to claim 2, characterized in that the database requests the data to be stored in the database from the memory unit of each individual component.

16. Method according to claim 2, characterized in that the database. is operated in a component, which is configured as one of a control unit that is of a higher order than the individual component transmitting the data, and as a data server.

17. Method according to claim 2, characterized in that the database is operated in one of a stationary and a mobile computer, which can be connected to the communications network via a network interface.

18. Method according to claim 2, characterized in that the data that characterizes each individual component is stored, together with information relating to the time of the data transfer, in the database.

19. Method according to claim 2, characterized in that the data transferred from the memory units of each of the individual components belonging to the printing press to the database are always stored in chronological order.

20. Method according to claim 2, characterized in that the data stored in the databases of each of the individual components belonging to the printing press are made available for remote access.

21. Method according to claim 2, characterized in that additional operational data are stored in each of the databases of the individual components belonging to the printing press.

22. Method according to claim 2, characterized in that service lives for each of the individual components belonging to the printing press are stored in the database.

23. Method according to claim 15, characterized in that the database requests data that characterize each individual component from the respective memory units of all of the individual components located in the printing press.

24. Method according to claim 15, characterized in that the database requests data characterizing the plurality of individual components located in the printing press from the memory units of each of said individual components, once the printing press has been placed in service.

25. Method according to claim 24, characterized in that the database compares the data requested from the memory unit of one of the individual components belonging to the printing press, once said printing press has been placed in service, with the data that are transferred each time a component is placed in its active operational status, and stores the current, data, together with a time marking, in the database, when the comparison reveals an inconsistency in the compared data.

26. Method according to claim 22, characterized in that, if the individual components belonging to the printing press should exceed their service life as stored in the database, this will be reported by at least one of an operating unit and a visualization unit.

27. Method according to claim 5, characterized in that a detected version conflict with respect to at least one of hardware and firmware and parameter files to be used in relation to the electronic component is reported by the at least one of the operating unit and the visualization unit.

28. Method according to claim 5, characterized in that, to prevent a version conflict with respect to at least one of the hardware and firmware and parameter files to be used in relation to the electronic component, an update of at least one of the firmware and the parameter file is supplied to the electronic component and is implemented with respect to this electronic component.

29. Method according to claim 27, characterized in that the initiation of operation of the electronic component, despite a reported version conflict with respect to at least one of the hardware and firmware and a parameter file of this electronic component requires manual confirmation by the operator of the printing press.

30. Method according to claim 7, characterized in that the indication of at least one of the structural component type and the serial number and the hardware version and the firmware version of each individual component are stored in the memory unit of the individual component as unmodifiable data.

31. Method according to claim 10, characterized in that data from one of the control levels of the relevant machine unit is one of intermediately stored and managed in a memory unit belonging to this machine unit.

32. Method according to claim 10, characterized in that at least one drive unit provided in the machine unit is controlled by at least one motion control system which is provided in the machine unit.

33. Method according to claim 10, characterized in that at least one sequencing control system, which is provided in the machine unit, one of enables and controls at least the transmission of data to at least one field device which is located in another lower-order control level.

34. Method according to claim 12, characterized in that the communications unit is configured as an aggregate router.

35. Method according to claim 12, characterized in that the communications network is configured as a field bus.

* * * * *